US012791140B2

(12) United States Patent
Santos Lima et al.

(10) Patent No.: US 12,791,140 B2

(45) Date of Patent: Nov. 10, 2026

(54) DEVICE FOR LEAK CONTAINMENT

(71) Applicant: PETRÓLEO BRASILEIRO S.A.—PETROBRAS, Rio de Janeiro (BR)

(72) Inventors: Vinicius Santos Lima, Ibirité (BR); Thiago Rafael De Oliveira, Betim (BR); Wagner Henrique Saldanha, Betim (BR); Elbert Fernando Martins Coelho, Contagem (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 279 days.

(21) Appl. No.: 18/784,726

(22) Filed: Jul. 25, 2024

(65) Prior Publication Data

US 2025/0109816 A1 Apr. 3, 2025

(30) Foreign Application Priority Data

Sep. 28, 2023 (BR) .......................... 2020230200325

(51) Int. Cl.
*F16L 55/17* (2006.01)
*F16L 23/00* (2006.01)

(52) U.S. Cl.
CPC ......... *F16L 55/1705* (2013.01); *F16L 23/003* (2013.01)

(58) Field of Classification Search
CPC ......... F16L 55/16; F16L 55/168; F16L 55/17; F16L 55/1705; F16L 55/178; F16L 23/003
See application file for complete search history.

(56) References Cited

U.S. PATENT DOCUMENTS 866,395 A * 9/1907 Skinner ................. F16L 15/008 285/15
3,592,480 A 7/1971 Koranyi et al.
6,244,630 B1 * 6/2001 Baucom ................ F16L 23/003 285/294.1
2022/0090724 A1 * 3/2022 Jeaurond ................... F17D 5/04
2024/0133504 A1 * 4/2024 Martins Coelho ...... F16L 55/17

* cited by examiner

*Primary Examiner* — Bryan M Lettman

(74) *Attorney, Agent, or Firm* — Troutman Pepper Locke LLP

(57) ABSTRACT

A device for leak containment, including a set of compression plates, which respectively contain fixed thereto a plurality of fixing clamps for anchoring the device, and a plurality of tightening elements including screws and nuts, at least one filling element, a set of hollow tubular elements, and a tensioning cable passing inside the set of hollow tubular elements. A tensioning of the tensioning cable, together with a tightening of the plurality of tightening elements, presses the set of hollow tubular elements and compresses at least one filling element.

1 Claim, 7 Drawing Sheets

DEVICE FOR LEAK CONTAINMENT

CROSS-REFERENCE TO RELATED APPLICATION(S)

This application claims priority to Brazilian Patent Application No. BR2020230200325, filed Sep. 28, 2023, which is hereby incorporated herein by reference in its entirety.

FIELD OF THE DISCLOSURE

The present description refers to the technical field of devices for containing and/or plugging leaks in equipment. More specifically, a device for containing leaks from flanged joints in a piece of equipment, without interrupting the operation thereof.

BACKGROUND

Containing leaks in refinery equipment is extremely important to guarantee normal production, avoid stops to carry out interventions and reduce the possible environmental impact of such leaks.

The products or effluents contained in the equipment are often highly flammable and explosive. Therefore, such products or effluents make repairs involving welding unfeasible.

Alternatively, the cover or other element of the flanged joint can be exchanged; however, to do so, the piece of equipment needs to be deactivated to carry out this operation. However, such stoppages, especially if unplanned, can generate losses due to lost profit.

Furthermore, as flanged joints often have interference in the union region, the injection of sealants to contain the leak may not be effective, as on one side of the equipment there would not be space to place a support to contain the sealants in the leak region, drastically reducing the effectiveness of such a solution.

Accordingly, devices for containing leaks from flanged joints in a piece of equipment, without interrupting the operation of the unit, are desirable.

Therefore, a low-cost device is proposed that makes it possible to carry out containment with a routine maintenance team, which has easy and quick assembly, and which provides an effective result of containing a leak. Furthermore, the aforementioned device does not require the unit to stop production in order to carry out the necessary intervention.

STATE OF THE ART

In the State of the Art, there are documents addressed to devices for plugging leaks in flanges. In particular, the following documents found in the state of the art stand out:

Document U.S. Pat. No. 6,244,630B1 discloses a method and apparatus for non-intrusive online leak sealing of flanged piping connections. More specifically, the document discloses that a pressurized leaking flanged joint is sealed with a ¼ circle load support structure, a jacking bolt extending therethrough and applying a radial load to a sealing plug between the flange gap. The jacking bolt is torqued and subsequently applies a radial load to the compression ring, which radial load is transferred to the load support structure and then to two flange bolts against which the load support structure bares. The radial load on the compression rings compresses the packing material into the pathway of the leak, thereby sealing the same.

Document U.S. Pat. No. 3,592,480A discloses an adjustable joint comprising two flanges that are arranged at a certain distance from each other with the help of a first and a second spacer arranged at a distance from each other, wherein a sealing strip of elastomeric material is disposed between the flanges and proximate the second spacer, and wherein a resilient strip is disposed between the flanges and between the sealing strip and the first spacer, and a plurality of means in the space between the resilient strip and the first spacer, for adjustably press the resilient strip towards the second spacer.

Document U.S. Pat. No. 866,395A discloses a device intended for application to stop leakage through the joint formed between two abutting pipe sections provided with flanged unions, or for similar purposes. The document discloses a pair of segments that together form a complete ring. Each segment is channel-shaped in cross-section and each channel is deep enough to accommodate a sectional clamping ring and a compressible sealing ring. A series of adjusting screws are provided, with each being threaded radially through the outer wall of the outer ring, or main ring, and arranged to impinge at its inner end against the underlying ring segment.

However, the features and advantages of the present technology in relation to the State of the Art will clearly emerge from the detailed description below and with reference to the attached drawings, these being provided as a preferred, non-limiting embodiment.

SUMMARY

A preferred embodiment of the present disclosure describes a device for leak containment, comprising a set of compression plates, which have fixed thereto a plurality of fixing clamps for anchoring the device, and a plurality of tightening elements comprising screws and nuts, at least one filling element, a set of hollow tubular elements, and a tensioning cable passing inside the set of hollow tubular elements. A tensioning of the tensioning cable, in conjunction with a tightening of the plurality of tightening elements, presses the set of hollow tubular elements and compresses at least one filling element.

BRIEF DESCRIPTION OF THE DRAWINGS

In order to complement this description and obtain a better understanding of the features of the present disclosure, a set of figures is presented in which, in a non-limiting way, the preferred embodiment thereof is represented.

DETAILED DESCRIPTION

The present disclosure refers to a device for leak containment 100. More specifically, the device for leak containment 100 is applied to the flanged joints of a piece of equipment and enables leak containment without interrupting the operation thereof.

Briefly, the device 100 of the present disclosure enables the installation, tensioning and compression of a filling on the straight surfaces and corners of a flanged joint by way of a tensioning cable surrounded by a set of hollow tubular elements in combination with a plurality of tightening elements back-pressed by fixing clamps, the installation, tensioning and compression being sufficient to contain a leak from a flanged joint of a piece of equipment without interrupting the operation thereof.

Figure 1:
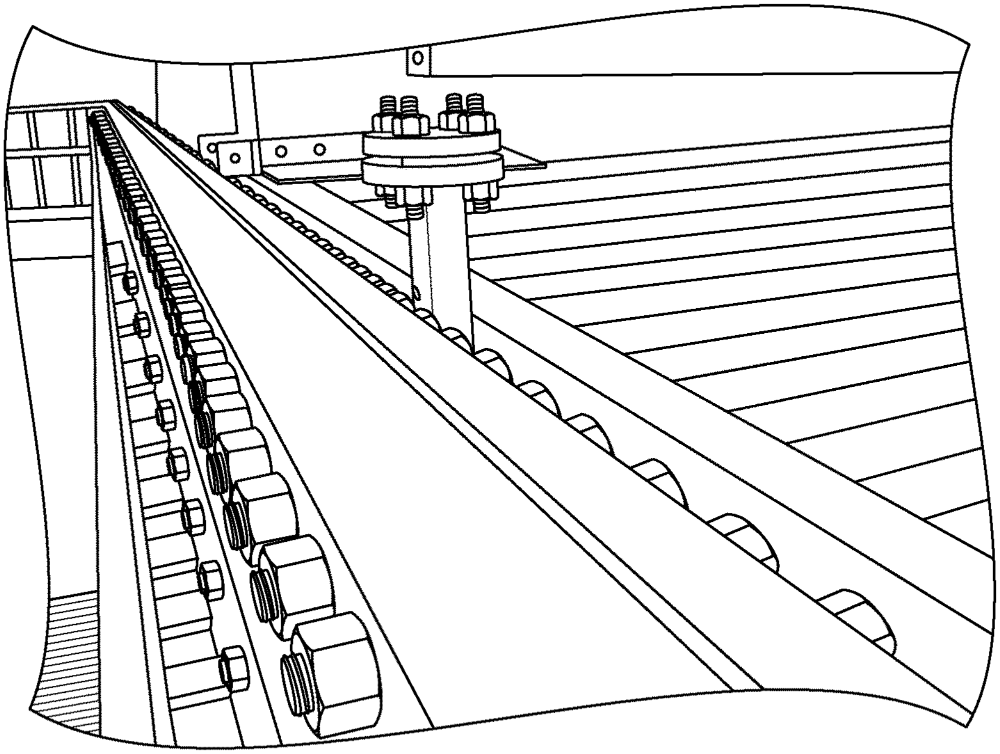
FIG. 1 illustrates an exemplary image of a leak from a flanged joint of a piece of equipment.
Figure 2:
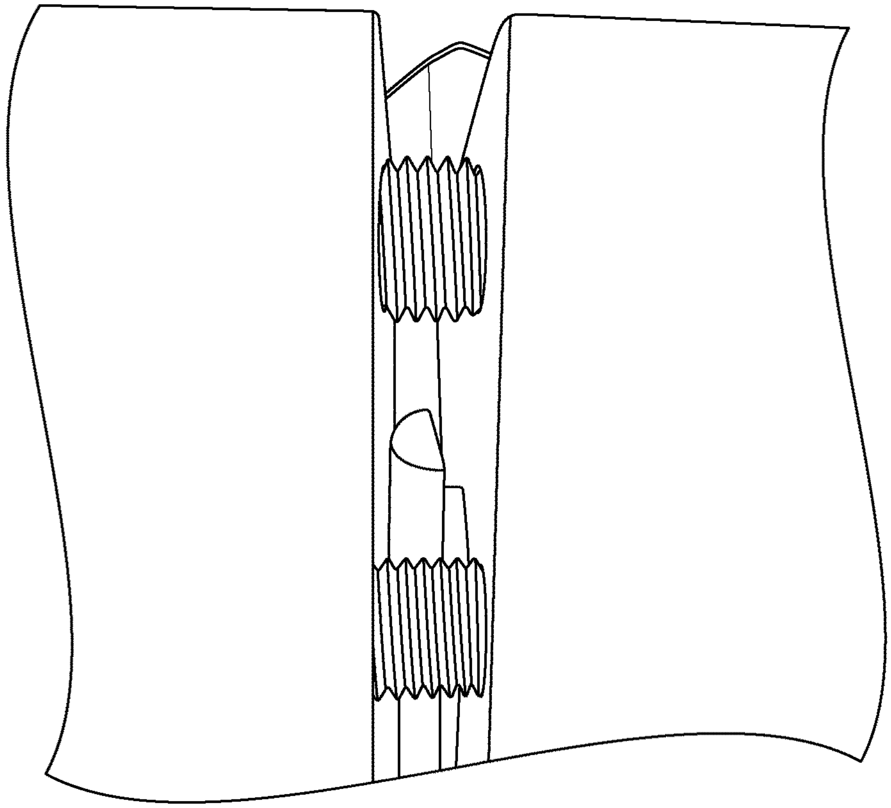
FIG. 2 illustrates an exemplary image of a joint with a non-circular or rectangular flange of a piece of equipment.

FIG. 1 illustrates an exemplary image of a leak from a flanged joint of a piece of equipment. Furthermore, as illustrated in FIG. 2, the flanged joint of a piece of equipment generally comprises two surfaces joined by a plurality of tightening mechanisms, such as screws and nuts. Such tightening mechanisms are advantageously used by examples of the present disclosure to enable effective containment of leaks in difficult to access locations, as will be discussed in greater detail below.

It will be appreciated by a technician skilled on the subject that examples of the present disclosure can be applied to joints with flanges of different configurations. Notwithstanding, in the example shown in FIG. 2, a cover of the heat exchanger has a "shouldered" sealing face and the head has a fitting for a flanged joint, creating two gaps between the flanges.

More specifically, the device for leak containment 100 comprises at least one set of compression plates 110, a plurality of fixing clamps 120, a plurality of tightening elements 130, at least one filling element 140, a set of hollow tubular elements 150, and a tensioning cable 160.

Figure 3:
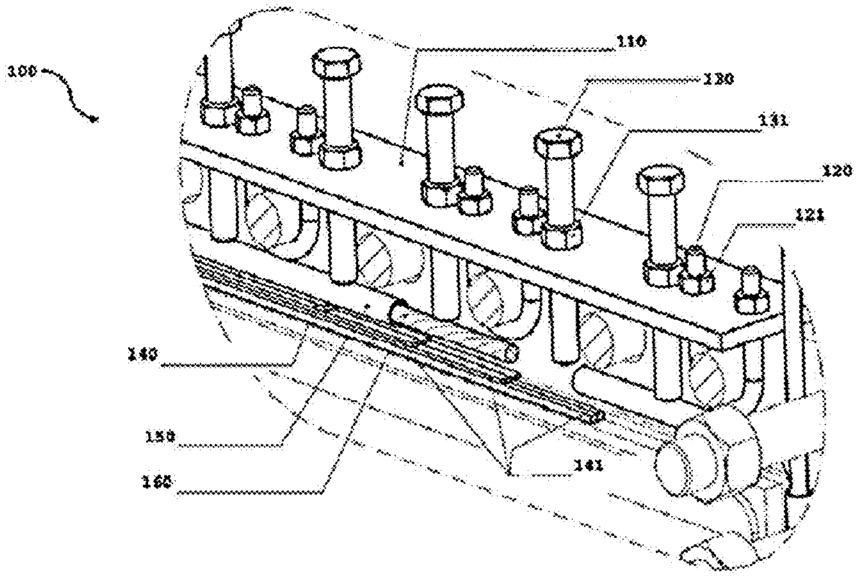
FIG. 3 illustrates a preferred configuration of the device of the present disclosure.

As illustrated in FIG. 3, in the preferred configuration of the device for leak containment 100, the set of compression plates 110 has the function of enabling the support and assembly of other elements of the device thereon.

The set of compression plates 110 preferably comprises metal plates of substantially rectangular shape and with sufficient thickness to provide rigidity to the set, depending on the piece of equipment in which the device 100 is mounted to contain a leak. Preferably, the set of compression plates 110 comprises at least four metal plates, one for each side of the flanged joint, wherein each plate has a thickness of at least ¼" (6.35 mm).

Figure 4:
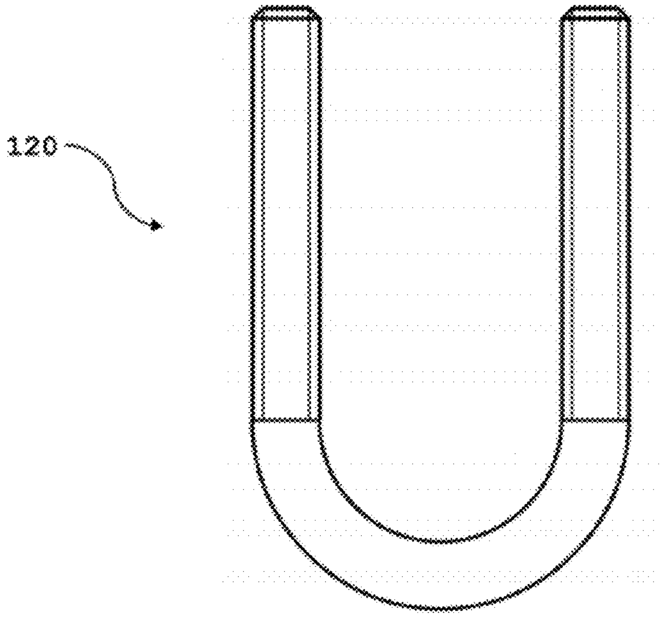
FIG. 4 illustrates a preferred configuration of a "U" clamp.

As illustrated in greater detail in FIG. 4, the plurality of fixing clamps 120 preferably comprises "U" type clamps. These are arranged fitted to respective bolts of a flanged joint and tightened by way of nuts 121 on the set of compression plates 110. The plurality of fixing clamps 120 thus makes it possible to anchor and tighten the set of compression plates 110 on a flanged joint. Preferably, the fixing clamps 120 are sized according to the design strengths of each flanged joint.

Figure 5:
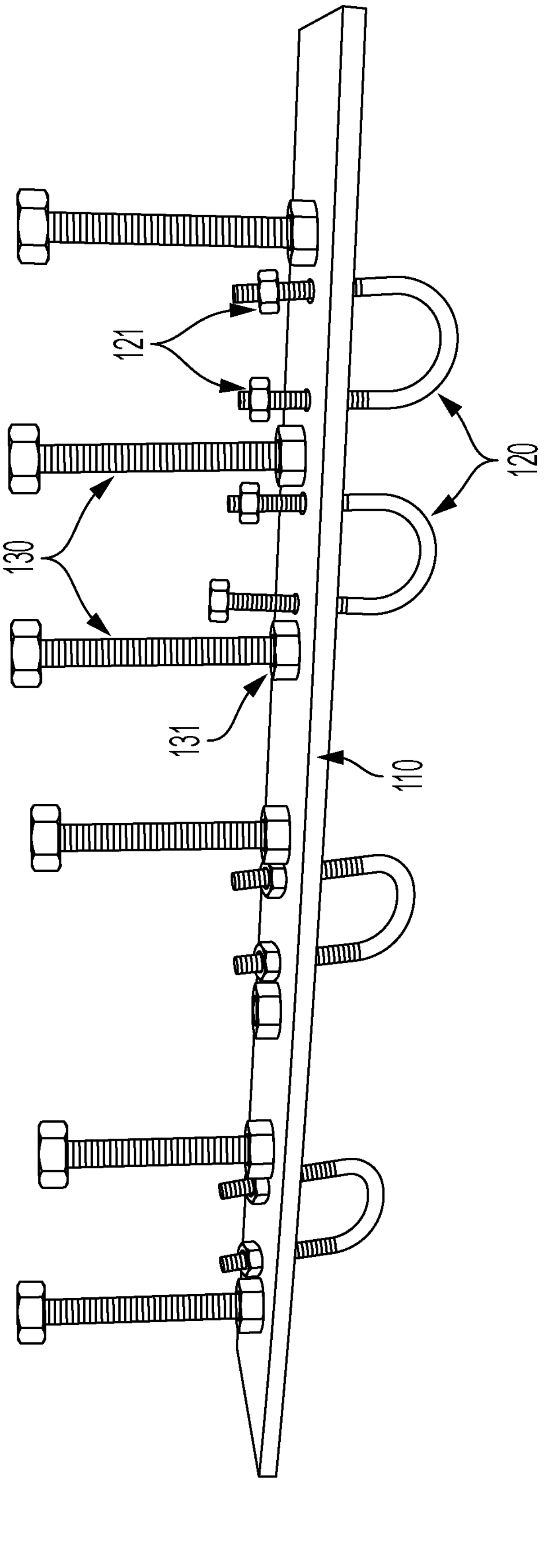
FIG. 5 illustrates an image of a part of the device of the present disclosure in a disassembled state.

The plurality of tightening elements 130 preferably comprises tensioning screws containing nuts 131. As illustrated in FIG. 5, the nuts 131 are preferably welded to the set of compression plates 110. The tensioning screws and respective nuts can be sized accordingly with the design strengths of each flanged joint.

At least one filling element 140 is preferably at least one gasket. It will be appreciated that more than one gasket may be required for an ideal seal, as illustrated in FIG. 3. Furthermore, the existence of gaps of different widths in flanged joints requires that the seal be made with gaskets of different widths. Therefore, to carry out the seal, it may be necessary to start with first layers of gaskets of smaller dimensions 141 being introduced, and, after completing the filling with gaskets of smaller dimensions 141, there can be introduced gaskets with widths compatible with a greater spacing between the flanges.

Notwithstanding, although a preferred configuration of gaskets is illustrated and described, it will be appreciated by a technician skilled on the subject that the quantity and dimensions of gaskets used may vary according to the design strengths of each flanged joint.

The set of hollow tubular elements 150 preferably comprises rigid pipes or OD (outer diameter) of metallic material. The rigid pipes may have a circular, elliptical, triangular, square, rectangular, pentagonal, hexagonal, rhombic, diamond, star-shaped, trapezoidal, polygonal cross-section, etc. Preferably, the set of hollow tubular elements 150 has a circular cross-sectional shape. It will be appreciated by a technician skilled on the subject that the dimension of the set of hollow tubular elements 150 may vary according to the design strengths of each flanged joint. Preferably, the hollow tubular elements 150 are suitably sized to allow the free passage of the tensioning cable 160 inside the same.

The set of hollow tubular elements 150 allows the tensioning cable 160 to pass inside the tubular elements, and these are segmented into lengths to enable the assembly on the four sides (straight parts) of a flanged joint. It is observed that in the four "corners" of the flanged joint, the tensioning cable 160 is not covered by the tubular elements.

Accordingly, once the device 100 is mounted on a flanged joint, the tensioning screws 130 are tightened in order to press on the set of hollow tubular elements 150, which, in turn, compress at least one filling element 140, to then seal the leak.

Figure 6:
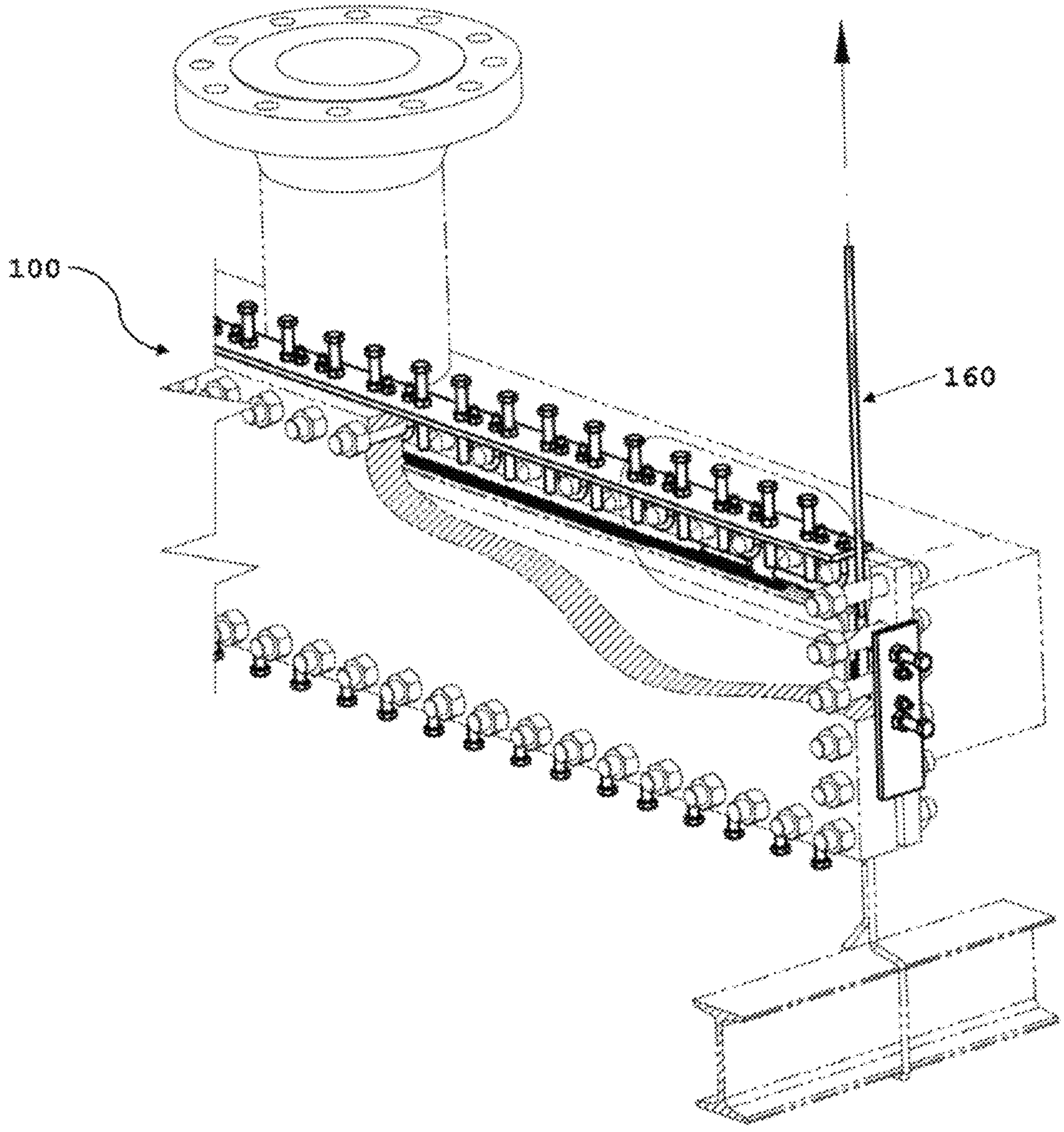
FIG. 6 illustrates a preferred assembling configuration of the device of the present disclosure in a piece of equipment.

The tensioning cable 160 is preferably a steel cable. When pulling on the steel cable, as illustrated in FIG. 6, it will exert enough pressure to seal the "corners". As the straight parts are long, in these regions, the cable is only pulled, and may not exert significant pressure to compress the gaskets.

Notwithstanding, the reason that the cable 160 is surrounded by the set of hollow tubular elements 150 in the straight regions is to provide the cable/pipe assembly with the necessary rigidity, so that the force that will be applied in the compression direction of the gaskets 140, 141 can be transferred and distributed. Therefore, the pressure in the straight regions is substantially carried out by the tensioning screws 130.

Figure 7:
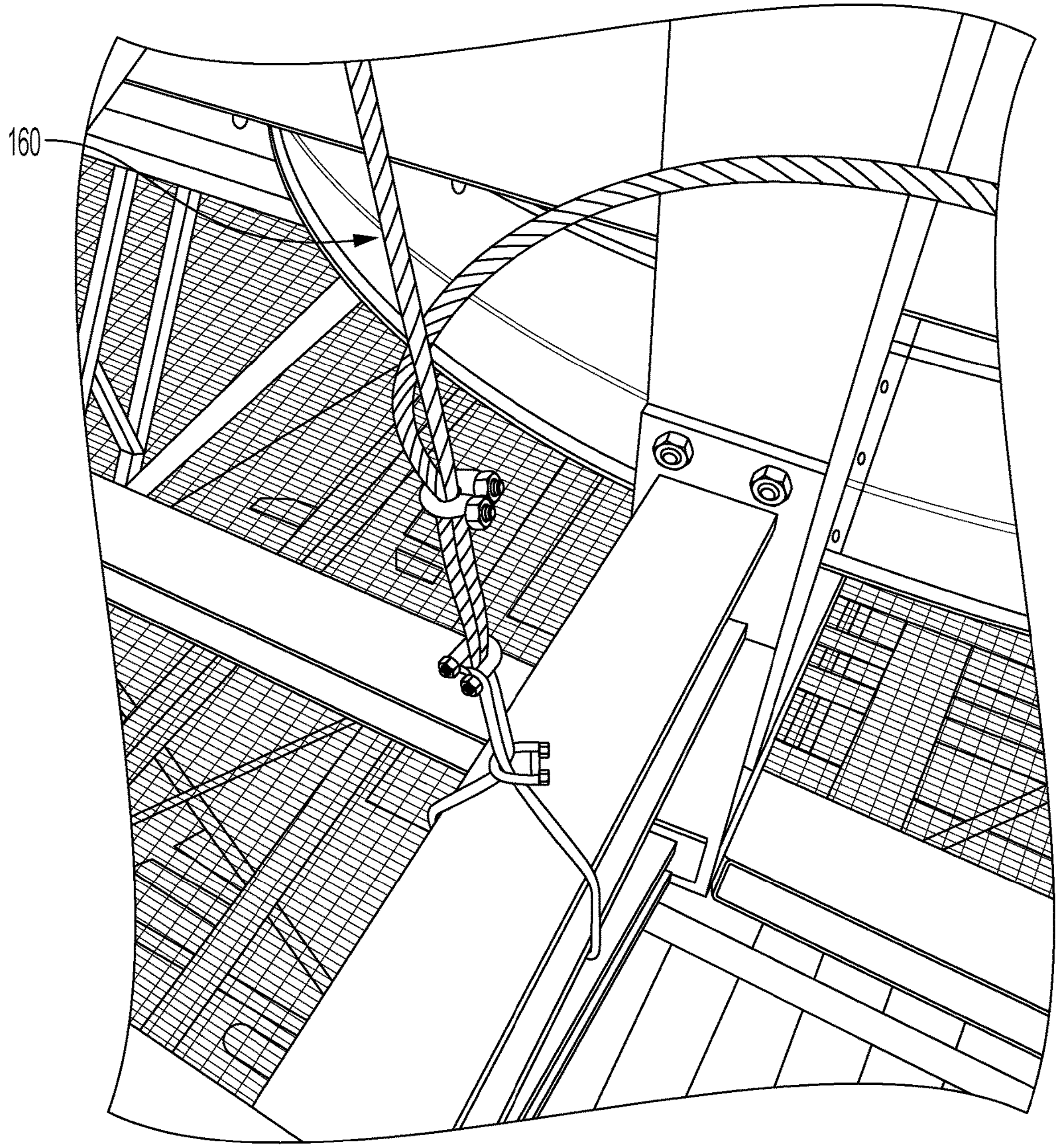
FIG. 7 illustrates an image of a tiedown for tensioning.

As illustrated in FIGS. 6 and 7, the tensioning cable 160 should preferably be fixed and tensioned in a structure close to the flanged joint in which a leak is to be contained. Optionally, other mechanisms for fixing and tensioning the tensioning cable 160 may be implemented, provided that they provide sufficient tensioning to the tensioning cable 160 for sealing at the "corners" of the flanged joint.

In this sense, below a preferred implementation of the present device in a flanged joint will be briefly described as an example.

The steps of implementing the device 100 to perform the seal begin with the introduction of the first layers of gaskets with dimensions compatible with the gap of smaller width. After completing the filling of the smaller gap with the introduction of the first layers of gaskets, one or more gaskets are introduced with a width compatible with the greater spacing between the flanges.

Next, with the gaskets installed in place, the assembly of the pipe/steel cable set begins; the steel cable is surrounded by a set of pipes that have a diameter compatible with the larger spacing of the flanges. These pipes are segmented into lengths that allow assembly on the four sides (straight parts) of the flanged joint, and wherein, in the four "corners", the steel cable is not covered by the pipes.

When pulling the steel cable by tying the same down to a structure close to the flanged joint, the steel cable will exert enough pressure to seal only at the "corners". As the straight parts are long, in these regions the cable is only pulled, without exerting significant pressure to compress the gaskets, as shown in the illustration below.

In straight regions, the compression plate that is fixed to the cases/closing screws of the flanged joint has "U" type clamps and tensioning screws that, when threaded/tightened, exert pressure on the pipe/steel cable set, which then compresses the gaskets to provide sealing and containment of the leak.

Figure 8:
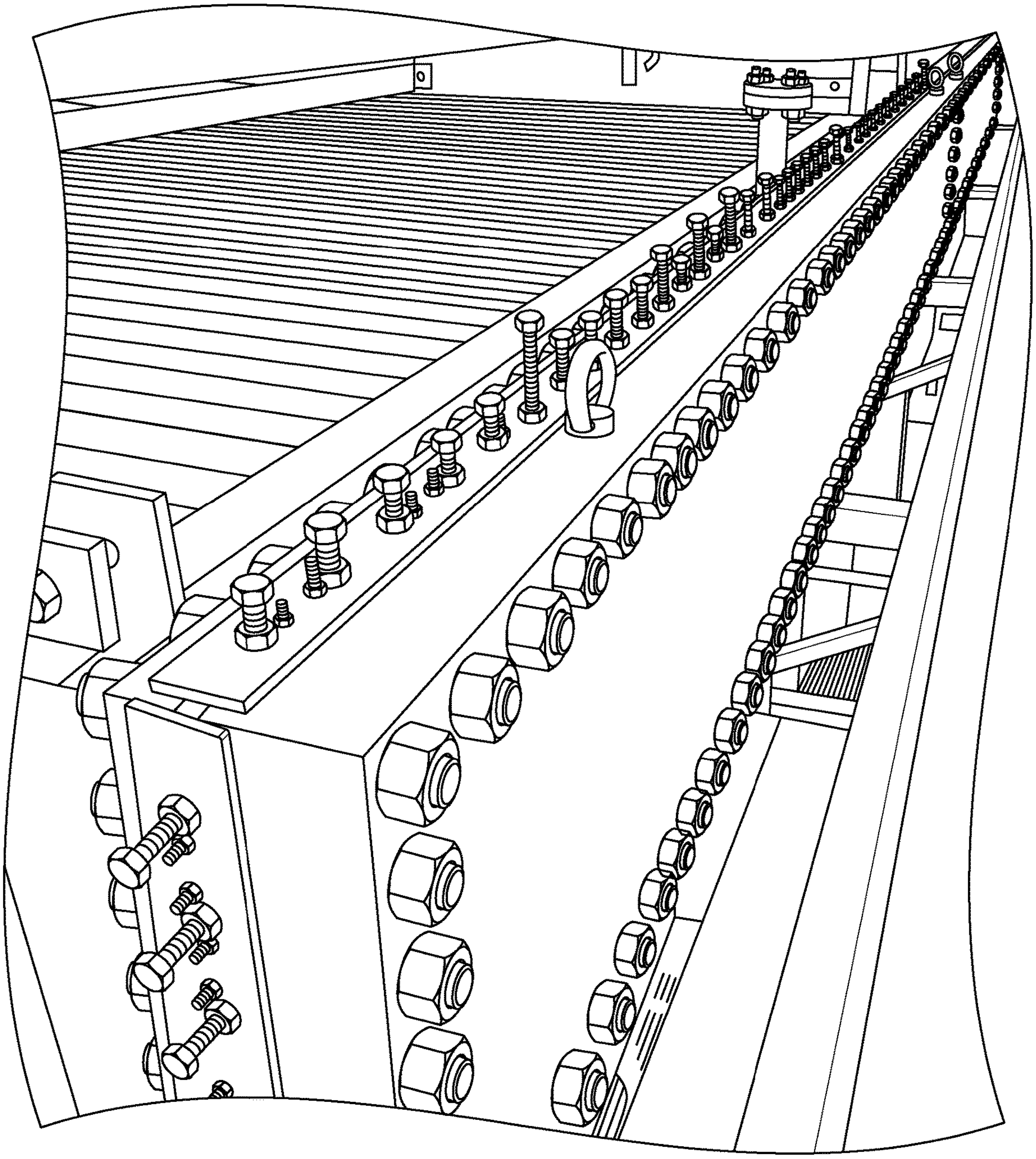
FIG. 8 illustrates a top image of the device of the present disclosure in an assembled configuration.
Figure 9:
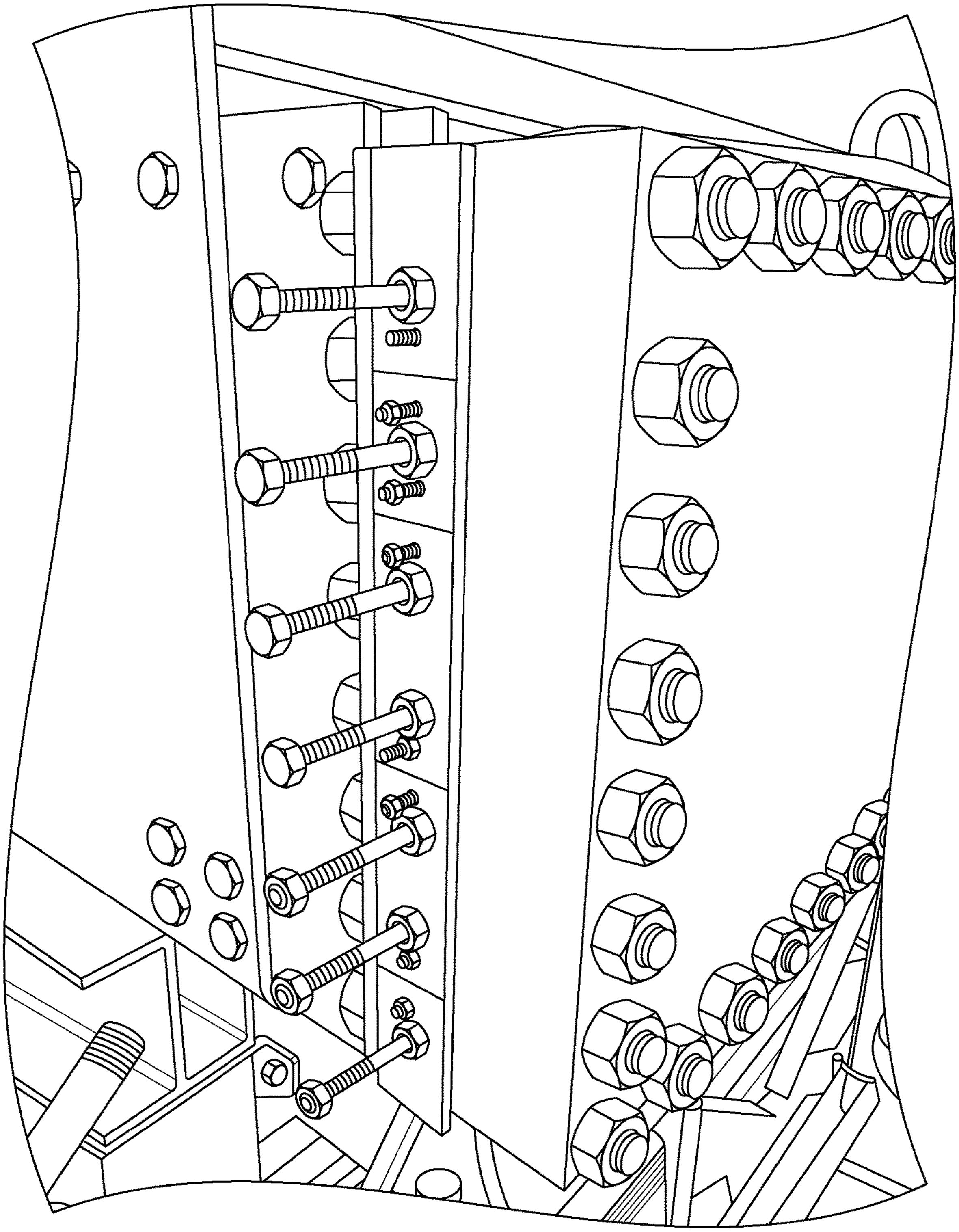
FIG. 9 illustrates a side image of the device of the present disclosure in an assembled configuration.

An assembled configuration of the device 100 containing a leak in a flanged joint is illustrated in FIGS. 8 and 9.

In this sense, a preferred embodiment of the disclosure teaches a device for leak containment 100 that comprises at least:

- a set of compression plates 110, respectively comprising fixed thereto a plurality of fixing clamps 120 for anchoring the device 100 in a flanged joint, and a plurality of tightening elements 130;
- at least one filling element 140;
- a set of hollow tubular elements 150; and
- a tensioning cable 160 passing inside the set of hollow tubular elements 150;
- wherein a tensioning of the tensioning cable 160, together with a tightening of the plurality of tightening elements 130, presses the set of hollow tubular elements 150 to compress at least one filling element 140 over a leak.

In this way, those skilled in the art will understand the knowledge presented herein and will be able to reproduce examples of the present disclosure described herein, encompassed by the scope of the attached claim.

The invention claimed is:

1. A device for leak containment, the device comprising:

a set of compression plates, which respectively comprises fixed thereto a plurality of fixing clamps for anchoring the device, and a plurality of tightening elements comprising screws and nuts;

at least one filling element;

a set of hollow tubular elements; and a tensioning cable passing inside the set of hollow tubular elements, wherein a tensioning of the tensioning cable, together with a tightening of the plurality of tightening elements, presses the set of hollow tubular elements and compresses at least one filling element.

* * * * *